United States Patent
Sentinelli

(10) Patent No.: US 6,205,327 B1
(45) Date of Patent: Mar. 20, 2001

(54) RADIO MOBILE TERMINAL PROVIDED WITH AN ADDITIONAL READER OF CHIP CARDS

(75) Inventor: Mauro Sentinelli, Rome (IT)

(73) Assignee: Telecom Italia Mobile S.P.A., Turin (IT)

( * ) Notice: Subject to any disclaimer, the term of this patent is extended or adjusted under 35 U.S.C. 154(b) by 0 days.

(21) Appl. No.: 09/000,444

(22) PCT Filed: Jul. 24, 1996

(86) PCT No.: PCT/IT96/00151

§ 371 Date: Jan. 26, 1998

§ 102(e) Date: Jan. 26, 1998

(87) PCT Pub. No.: WO97/05729

PCT Pub. Date: Feb. 13, 1997

(30) Foreign Application Priority Data

Jul. 27, 1995 (IT) .............................. RM95A0521

(51) Int. Cl.[7] ................................... H04Q 7/20
(52) U.S. Cl. ................ 455/407; 455/558; 455/575; 455/552
(58) Field of Search ................... 455/406–411, 550–558, 455/575, 90; 379/114, 132, 144, 357

(56) References Cited

U.S. PATENT DOCUMENTS

| 5,887,266 | * | 3/1999 | Heinonent et al. | 455/558 |
| 5,915,226 | * | 6/1999 | Martineau | 455/558 |
| 5,956,653 | * | 9/1999 | Lahti | 455/558 |
| 6,012,634 | * | 1/2000 | Brogan et al. | 455/407 |

FOREIGN PATENT DOCUMENTS

| 2267794 | 12/1993 | (GB) . |
| 2269512 | 2/1994 | (GB) . |
| WO95/02949 | 1/1995 | (WO) . |

OTHER PUBLICATIONS

Patent Abstracts of Japan, vol. 13, No. 175, Apr. 25, 1989 & JP, A, 01 008492 (Toshiba Corp.), Jan. 12, 1989.

* cited by examiner

Primary Examiner—Reinhard J. Eisenzopf
Assistant Examiner—Duc Nguyen
(74) Attorney, Agent, or Firm—Jacobson, Price, Holman & Stern, PLLC

(57) ABSTRACT

Radio mobile terminal provided with an additional chip card reader of prepaid chip cards, which can be made available both on a terminal realized according to the TACS technology and on a terminal employing the GSM technology. The prepaid chip card embodies the payment means for the radio mobile telephone service.

1 Claim, 1 Drawing Sheet

RADIO MOBILE TERMINAL PROVIDED WITH AN ADDITIONAL READER OF CHIP CARDS

BACKGROUND OF THE INVENTION

1. Technical Field

The present invention relates to a radio mobile terminal provided with an additional reader of chip cards, and more particularly it relates to a radio mobile terminal provided with an additional reader of prepaid chip cards, which can be implemented both on terminals realized with the TACS (Total Access Communication System) technology, and on terminals employing the GSM (Global System for mobile communication) technology.

2. Background Art

Presently, both the TACS service of mobile telephony and the GSM telephone service do not provide prepaid chip cards, notwithstanding their wide diffusion. On the other hand, the advantages of telephonic prepaid cards are well known in public telephony, since they allow their user to continuously check the amount of the credit and expense.

GB patent 2 269 512 A (Nokia) relates to a radio telephone arrangement comprising two or more card readers for accomodating a corresponding number of memory cards, in the form of subscribers-identity modules (Sims). The telephone is adapted to use the information from one of the memory cards (to* the exclusion of the other memory cards) in accordance with a predetermined priority allocation and the prioritization may be reset automatically if a card is removed or inserted, or the user may modify the priorities, e.g. by menu selection.

First of all this kind of radio telephone does not take into account the use of a prepaid card in one of the provided card readers, and on principle it doesn't relate to a specific mobile cellular phone, but to a radio telephone plant to which two or more card readers can be added according to the necessity.

In any case the prioritization for using one of the card readers instead of another is completely foreseeable and obvious, also because no prepaid chip card is provided is GB patent 2 267 794 relates to a pre-payable mobile cellular telephone communication system. According to the invention there is provided a cellular telephone where present handsets are adapted so that a cartridge or a smart card is inserted to the handset enabling connection to the network and thus make out-going telephone calls.

In this realization the handset would still be able to receive incoming calls even if the cartridge was not inserted and even if there were no credited "airtime" available.

In any case the prepayable mobile cellular phone does not absolutely provide for the employment of a SIM card which would permit the use of the cellular phone according to a subscription contract with payment posterior to the phone call.

This use is provided neither with the card reader accommodating the prepaid chip card nor by a second supplementary port. Of course in this kind of embodiment there is not any problem of prioritization for using several telephone card readers.

SUMMARY OF THE INVENTION

An object of the present invention is to realize a radio mobile terminal provided with an additional reader of chip cards, which allows to increase the functionality of the terminal, permitting the utilization of prepaid cards for paying the radio mobile service, when benefiting by this service.

A further object of the present invention is to provide a radio mobile terminal with an additional reader of chip cards, wherein the additional reader is compatible with the prepaid chip cards issued by the administrator of this service and can manage the various operations (validation, obliteration, card change, etc.).

At last another object of the invention is to realize a radio mobile terminal provided with an additional chip card reader, being completely consistent with the presently employed construction technologies in the field of mobile telephony and being easy to handle by the final user.

DESCRIPTION OF THE INVENTION

Figure 1:
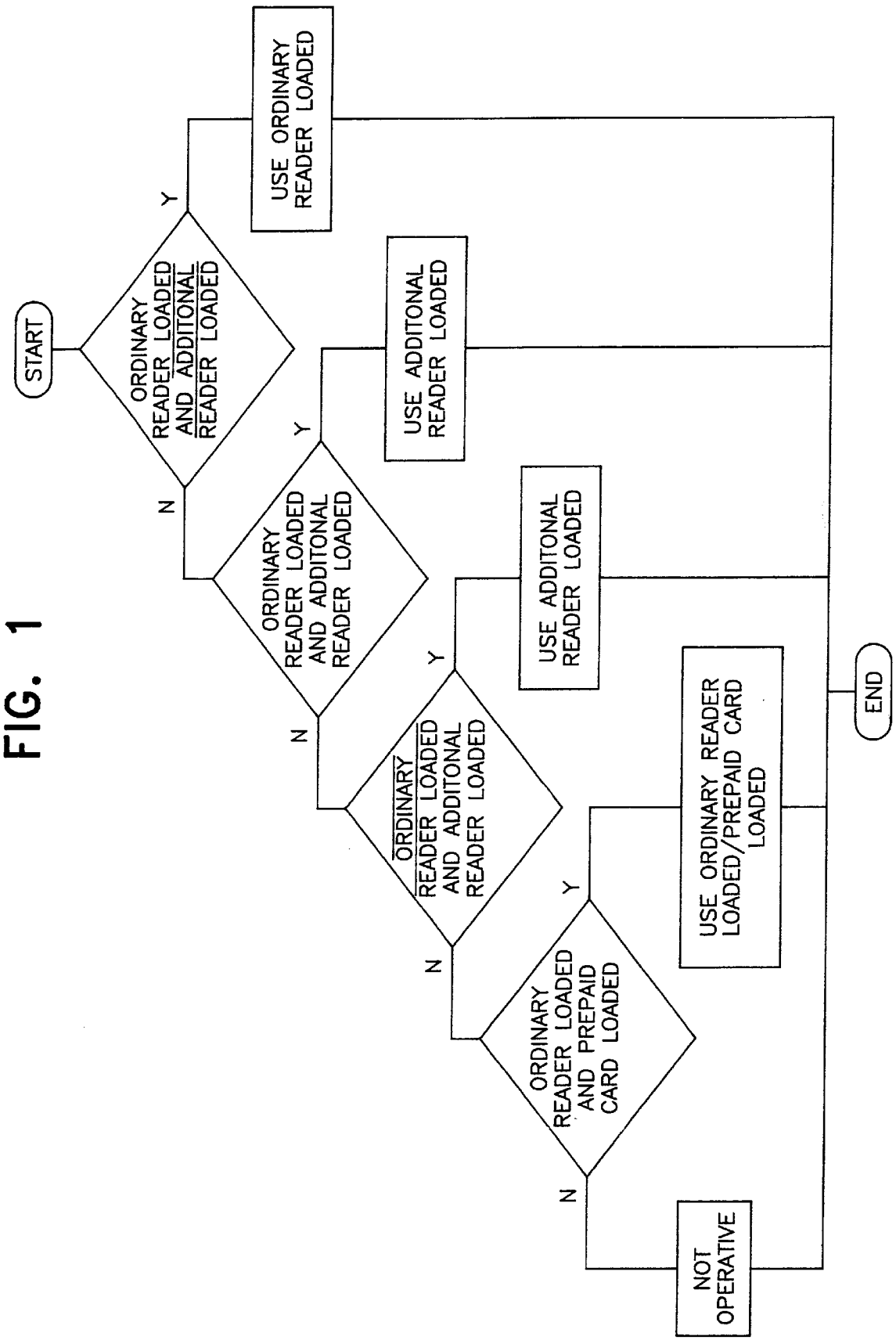
FIG. 1 illustrates a flow diagram of the present invention.

The above and other objects which will be clearly illustrated in the course of this description, will be attained by a radio mobile terminal provided with an additional reader of chip cards, wherein an additional reading device (a second reader corresponding to a standard format in the case of terminals of the GSM type) manages a prepaid chip card which stores the amount of the available credit used for benefitting by the telephone service; said chip card embodies the payment means for the radio mobile service. The additional reader of chip cards complies with the ISO 7816-2 standard and the ID1 format, and it can read cards with six contacts as well as with eight contacts.

The radio mobile terminal being compatible with the network standard, is provided with all functions of the network, and it is additionally equipped with the functions related to the management of chip cards.

In the terminals of the GSM type the additional reader must also be realized so as to be able to read identification cards for mobile communication (SIM) (SIM=Subscriber Identity Module) having a format ID-1. In this case, the possible operative conditions of the terminal comprising two chip card readers are the following:

- if the SIM card is inserted in the usual (ordinary) reader and no card is inserted (loaded) in the additional reader ID-1, the terminal of the type GSM manages the SIM card of the ordinary reader;
- if two SIM cards are loaded, the SIM card of the ordinary reader and the SIM card of the additional reader ID-1, the GSM terminal manages the SIM card of the additional reader ID-1 only;
- if the ordinary or usual reader is not loaded and only the additional reader ID-1 is loaded, the GSM terminal manages the SIM card of the additional reader ID-1;
- if the ordinary reader is loaded and the prepaid card is loaded inside the additional reader, the GSM terminal manages the SIM card of the ordinary reader; the payment is carried out by means of the prepaid card inserted into the additional reader.

The additional reader of the terminal can also perform the following functions:

- it allows insertion and removal of the chip card, automatically and simply (without removing any mechanical part of the terminal);
- it prevents movement of the card during the telephonic conversation, except at the exhaustion of the credit, since the card change must be allowed;
- it automatically detects possible external connections with the card, stopping their operations.

The terminal provided with the additional reader displays the residual credit of the prepaid card, in the following operative situations:

when the terminal is in the stand-by condition, and the user acts on the keyboard in order to interrogate it; during a charged telephone call (performed from the terminal provided with the additional reader).

The additional reader of the terminal can perform also the following management procedures (besides the usual standard network procedures):

validation of the chip card;

decrease of the credit units from the chip card during the conversation;

change of the chip card which is becoming exhausted.

Industrial Applicability

The practical realization of the invention, as explained until now at an illustrative level, must of course not be interpreted in a limitative sense. Numerous and varied may be the configurations which, starting from the basic principle set forth in claim 1, employ an additional reader of prepaid chip cards in order to provide an optimum functionality of the terminal where they are located.

An additional straightforward application may concern the public telephones network implemented on the ferryboats, wherein the terminals are included in a network with a centralized management and wherein the terminal operates after the insertion of a SIM card which allows the identification of the user.

Also on this kind of terminals connected in a network, the provision of a double reader for managing prepaid chip cards results in an increase of the value of the services associated to the terminal itself.

What is claimed is:

1. A method, in a radio mobile terminal of the GSM type comprising an ordinary card reader and an additional chip card reader including additional reading device for managing chip cards of standard format, wherein said additional reading device is adapted to receive and to manage a prepaid chip card storing available credit to use a telephone service, said chip card embodying payment means for a radio mobile service, the additional reader being also adapted to perform reading of SIM cards of ID-1 format, providing the following conditions to operate the two card readers:

if a SIM card is loaded in the ordinary reader and no card is inserted in the additional reader ID-1, the terminal of the GSM type operates on the loaded SIM card of the ordinary reader;

if a SIM card is loaded in the ordinary reader and a second SIM card is loaded in the additional reader ID-1, the GSM terminal manages the second SIM card of the additional reader ID-1 only;

if the SIM card is not loaded in the ordinary reader and only the additional reader ID-1 is loaded the GSM terminal manages the SIM card of the additional reader ID-1; and if a SIM card is loaded in the ordinary reader and in the additional reader is loaded with a prepaid card, the GSM terminal operates on the SIM card of the ordinary reader; and the payment is carried out by means of the prepaid card introduced into the additional reader.

* * * * *